US009929830B2

(12) United States Patent
Stafford et al.

(10) Patent No.: US 9,929,830 B2
(45) Date of Patent: Mar. 27, 2018

(54) CONTENT DELIVERY OVER WIRELESS LINKS

(71) Applicant: Time Warner Cable Enterprises LLC, New York, NY (US)

(72) Inventors: Roger Stafford, Waxhaw, NC (US); Christopher Cholas, Frederick, CO (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 56 days.

(21) Appl. No.: 14/036,219

(22) Filed: Sep. 25, 2013

(65) Prior Publication Data

US 2015/0085757 A1    Mar. 26, 2015

(51) Int. Cl.
*H04L 1/00* (2006.01)

(52) U.S. Cl.
CPC .......... *H04L 1/0003* (2013.01); *H04L 1/0009* (2013.01); *H04L 1/0017* (2013.01)

(58) Field of Classification Search
CPC .................................................... H04L 1/0003
USPC ....................................................... 370/329
See application file for complete search history.

(56) References Cited

U.S. PATENT DOCUMENTS

| | | | | |
|---|---|---|---|---|
| 7,050,479 | B1* | 5/2006 | Kim ...................... | H04B 1/7143 375/132 |
| 8,300,716 | B1* | 10/2012 | Lee ........................ | H04L 1/0003 370/241 |
| 8,971,167 | B1* | 3/2015 | Srinivasa ............ | H04L 27/2608 370/208 |
| 2002/0006116 | A1* | 1/2002 | Burkhart ............ | H04B 7/18584 370/316 |
| 2004/0022213 | A1* | 2/2004 | Choi ...................... | H04L 1/0027 370/332 |
| 2004/0248520 | A1* | 12/2004 | Miyoshi ............... | H04B 7/2659 455/67.13 |
| 2005/0163067 | A1* | 7/2005 | Okamoto ............. | H04L 1/0003 370/321 |

(Continued)

OTHER PUBLICATIONS

"Constellations BPSK QPSK 16QAM 64QAM" downloaded Jun. 27, 2017 https://www.researchgate.net/figure/272483326_fig5_Fig-6-Constellation-diagram-of-a-BPSK-b-QPSK-c-8PSK-d-16QAM-and-e-64QAM.*

*Primary Examiner* — Maharishi Khirodhar
*Assistant Examiner* — Kenneth P Hunt
(74) *Attorney, Agent, or Firm* — Chapin IP Law, LLC

(57) ABSTRACT

An access point receives notification of a bit rate setting specifying a throughput needed to transmit corresponding content to a communication device. Based on the bit rate setting, the wireless access point identifies a set of multiple possible modulation-coding options supporting transmission of data at different bit rates greater than the bit rate setting needed to transmit the corresponding content. The wireless access point selects a respective modulation-coding option that provides a throughput bit rate that is lower than a modulation-coding option in the set providing a highest possible throughput bit rate. Selection of the lower bit rate modulation-coding option provides adequate capacity to transmit the corresponding content, yet does so with a higher signal to noise ratio than would be provided by the higher bit rate modulation-coding option. Subsequent to selection, the wireless access point transmits the corresponding content to the communication device via the selected modulation-coding option.

20 Claims, 10 Drawing Sheets

(56) References Cited

U.S. PATENT DOCUMENTS

| | | | |
|---|---|---|---|
| 2006/0002560 A1* | 1/2006 | Matsubara | H04W 12/02 380/270 |
| 2006/0209937 A1* | 9/2006 | Tanaka | H04L 1/0003 375/219 |
| 2007/0110002 A1* | 5/2007 | Yang | H04L 1/0003 370/335 |
| 2008/0214119 A1* | 9/2008 | Calvanese Strinati | H04L 1/0003 455/67.13 |
| 2009/0070841 A1* | 3/2009 | Buga | H04B 7/18506 725/116 |
| 2009/0147748 A1* | 6/2009 | Ofuji | H04J 11/0026 370/330 |
| 2009/0170509 A1* | 7/2009 | Cai | H04L 1/0003 455/434 |
| 2010/0054141 A1* | 3/2010 | Youn | H04H 20/42 370/252 |
| 2010/0054144 A1* | 3/2010 | Choi | H04L 1/0003 370/252 |
| 2010/0061345 A1* | 3/2010 | Wengerter | H04L 1/0017 370/335 |
| 2010/0189075 A1* | 7/2010 | Iwamura | H04W 36/0055 370/331 |
| 2010/0284393 A1* | 11/2010 | Abraham | H04L 5/0023 370/343 |
| 2010/0284454 A1* | 11/2010 | Oteri | H03M 13/353 375/224 |
| 2011/0013723 A1* | 1/2011 | Suga | H04L 1/0002 375/295 |
| 2011/0244788 A1* | 10/2011 | Ode | H04B 7/022 455/7 |
| 2011/0317635 A1* | 12/2011 | Swaminathan | H04W 36/0088 370/329 |
| 2012/0155447 A1* | 6/2012 | Vermani | H04L 1/0003 370/338 |
| 2013/0155966 A1* | 6/2013 | Bekiares | H04W 28/16 370/329 |
| 2013/0215813 A1* | 8/2013 | Kotecha | H04L 1/0017 370/312 |
| 2014/0204837 A1* | 7/2014 | Park | H04W 52/0229 370/328 |
| 2015/0229436 A1* | 8/2015 | Grant | H04B 7/061 370/252 |
| 2015/0381310 A1* | 12/2015 | Hammarwall | H04L 1/0003 370/329 |

* cited by examiner

MODULATION-CODING
OPTIONS
150

| INDEX VALUE | MODULATION TYPE | CODING RATE | THROUGHPUT (MBPS) |
|---|---|---|---|
| 0 | BPSK | 1/2 | 6.5 |
| 1 | QPSK | 1/2 | 13 |
| 2 | QPSK | 3/4 | 19.5 |
| 3 | 16-QAM | 1/2 | 26 |
| 4 | 16-QAM | 3/4 | 39 |
| 5 | 64-QAM | 2/3 | 52 |
| 6 | 64-QAM | 3/4 | 58.5 |
| 7 | 64-QAM | 5/6 | 65 |
| 8 | 256-QAM | 3/4 | 78 |
| ... | ... | ... | ... |

FIG. 2

MODULATION-CODING
OPTIONS
150

| INDEX VALUE | MODULATION TYPE | CODING RATE | THROUGHPUT (MBPS) |
|---|---|---|---|
| 0 | BPSK | 1/2 | 6.5 |
| 1 | QPSK | 1/2 | 13 |
| 2 | QPSK | 3/4 | 19.5 |
| 3 | 16-QAM | 1/2 | 26 |
| 4 | 16-QAM | 3/4 | 39 |
| 5 | 64-QAM | 2/3 | 52 |
| 6 | 64-QAM | 3/4 | 58.5 |
| 7 | 64-QAM | 5/6 | 65 |
| 8 | 256-QAM | 3/4 | 78 |
| ... | ... | ... | ... |

SET OF CANDIDATE MODULATION-CODING OPTIONS 160

FIG. 3

CONTENT DELIVERY OVER WIRELESS LINKS

BACKGROUND

Conventional computer devices can initiate communications with a respective WiFi™ access point in a network to establish a corresponding wireless communication link between the computer device and the selected WiFi™ access point.

Via the established wireless communication link, the computer device is able to communicate a request for content to the WiFi™ access point. The WiFi™ access point, on behalf of the computer device, forwards the request for content to an appropriate server resource. In response to receiving the request, the server resource transmits the requested content to the WiFi™ access point. Thereafter, the WiFi™ access point transmits the requested content over the wireless communication link to the computer device. Accordingly, a computer device can use a wireless access point as an intermediary to retrieve requested data.

A modulation-coding option for communicating between the computer device and WiFi™ access point can be selected depending on an amount of wireless signal attenuation between the between the WiFi™ access point and the corresponding computer device. For example, the amount of signal attenuation can vary based on a number of factors such as distance of separation between the computer device and the WiFi™ access point, a number or types of objects disposed in a respective path between the computer device and the WiFi™ access point, and so on.

Based at least in part on the amount of detected attenuation, the WiFi™ access point dynamically assigns one of multiple different modulation coding options that support a highest possible wireless bit transmission rate.

As mentioned above, the amount of wireless signal attenuation can vary over time. For example, a computer user can move from one location to another, increasing the amount of signal attenuation between the wireless access point and a corresponding computer device.

Thus, according to conventional WiFi™ standards, to accommodate changing conditions, the computer device and/or WiFi™ access point constantly re-negotiates for a highest possible bit rate modulation-coding option possible depending on a current amount of signal attenuation.

Current WiFi™ standards such as IEEE 802.11b/g/n/ac achieve ever-higher rates ranging from 1.1 Mega Bits per Second to 1.3 Gigabits per second by making use of multiple streams (MIMO), Beam-forming and Modulation Coding Options (MCS). These conventional techniques are all designed to maintain a maximum data rate at any particular range and radio frequency link budget.

BRIEF DESCRIPTION OF EMBODIMENTS

Conventional ways of transmitting communications in a wireless network environment as discussed above suffer from a number of deficiencies. For example, dynamic re-negotiation and selection of different modulation-coding options between a WiFi™ access point and corresponding computer device (based on link parameters such as attenuation) results in loss of data packets. That is, data packets are lost when a wireless access point switches from transmitting data from one modulation-coding option to another. Loss of data packets means that streaming of content over the WiFi™ connection may be at least temporarily interrupted. Additionally, lost data packets must be re-transmitted from the WiFi™ access point to the computer device, reducing efficiency of using available wireless bandwidth.

In certain instances, retransmission of data packets may not be possible. For example, the WiFi™ access point can be configured to transmit the requested content over the respective wireless via UDP (User Datagram Protocol). In accordance with such a protocol, there is no guarantee of data packet delivery. Loss of data packets in this instance is detrimental to coherency of playing back a corresponding real-time video stream because the data packets are not re-transmitted.

Embodiments herein include reducing loss of data packets transmitted in a wireless network environment. In accordance with one embodiment, to provide better quality of service and reduce interruptions, a wireless link can be configured to use a lower level of MCS (Modulation-Coding Scheme) encoding option to transmit data as opposed to transmitting data packets at a highest bit rate modulation-coding option. As further described herein, forcing selection of the MCS to a lower bit rate has the affect of extending a range in which a communication device can continue to communicate over a corresponding communication link even though signal attenuation has increased between the communication device and corresponding base station (such as due to a mobile user moving the communication device to be a further distance from the base station). Selecting the lower modulation-coding scheme also enables more reliable transmission of data, albeit at lower bit rates.

More specifically, in one embodiment, a wireless access point resides in a wireless network environment. The wireless access point receives notification of a bit rate setting needed to transmit corresponding content to a communication device. Based on the bit rate setting, the wireless access point identifies a set of multiple possible modulation-coding options supporting transmission of data at different bit rates greater than the bit rate setting needed to transmit the corresponding content.

In one embodiment, the wireless access point selects a respective modulation-coding option that provides a bit rate lower than the modulation-coding option in the set providing the highest possible bit rate. Selection of the lower bit rate modulation-coding option provides adequate capacity to transmit the corresponding content, yet does so with a higher signal to noise ratio than would be provided by the alternative higher bit rate modulation-coding option. Subsequent to selection, the wireless access point transmits the corresponding content to the target communication device in accordance with the selected modulation-coding option.

The selection of a respective modulation-coding option can be achieved in any number of different ways. For example, the wireless access point can be configured to receive notification to transmit corresponding content over a wireless communication link to a target communication device in the wireless network environment. The wireless access point produces an index value. The wireless access point uses the index value to select a modulation-coding option in a group of multiple possible modulation-coding options that have the appropriate capacity to transmit the corresponding content at a sufficiently high bit rate. As previously discussed, subsequent to selection of the modulation-coding option, the wireless access point transmits the corresponding content to the target communication device in accordance with the selected modulation-coding option.

Embodiments herein are useful in any wireless access points, Wireless Gateways (WG), Wireless IP-STB Clients (WC), laptop computers, notebook computers, tablet computers, cellular phone devices, any other WiFi connected device used for the delivery or reception of video content over a WiFi based network. Concepts as discussed herein can be applied to any device that utilizes one of the WiFi standards based on 802.11, where a higher quality of service (QoS) is desired, providing higher level of packet error performance instead of high bit rates with unpredictable packet error rates.

One embodiment herein includes forcing the MCS Index to one much lower than the WiFi standard would normally default to for any particular radio frequency link characteristic, but instead using an MCS Index that maximizes the available signal to noise ratio, hence lower error rates, with just enough data rate to sustain the maximum throughput requirements for the service. As a result the technique maximizes noise margins to greatly improve bit error and packet error rates.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiments herein include a computer readable storage medium and/or system having instructions stored thereon. The instructions, when executed by computer processor hardware, causes the computer processor hardware (such as in a wireless access point) to: receive notification of a bit rate setting at which to transmit corresponding content to a communication device; identify a set of multiple modulation-coding options supporting transmission of data at different bit rates, each of the different bit rates greater than the bit rate setting; select a modulation-coding option amongst the multiple modulation-coding options in the set; and transmit the corresponding content to the target communication device in accordance with the selected modulation-coding option.

One or more embodiments herein include a computer readable storage medium and/or system having instructions stored thereon. The instructions, when executed by computer processor hardware, causes the computer processor hardware (such as in a wireless access point) to: receive notification to transmit corresponding content over a wireless communication link to a target communication device in the wireless network environment; produce an index value; use the index value to select a modulation-coding option in a group of multiple modulation-coding options; and transmit the corresponding content to the target computer device via the selected modulation-coding option.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for managing transmission of content over a wireless communication link. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 2 is an example diagram illustrating multiple available modulation coding options according to embodiments herein.

FIG. 3 is an example diagram illustrating a set of candidate modulation coding options selected from the multiple available modulation-coding options according to embodiments herein.

Figure 1:
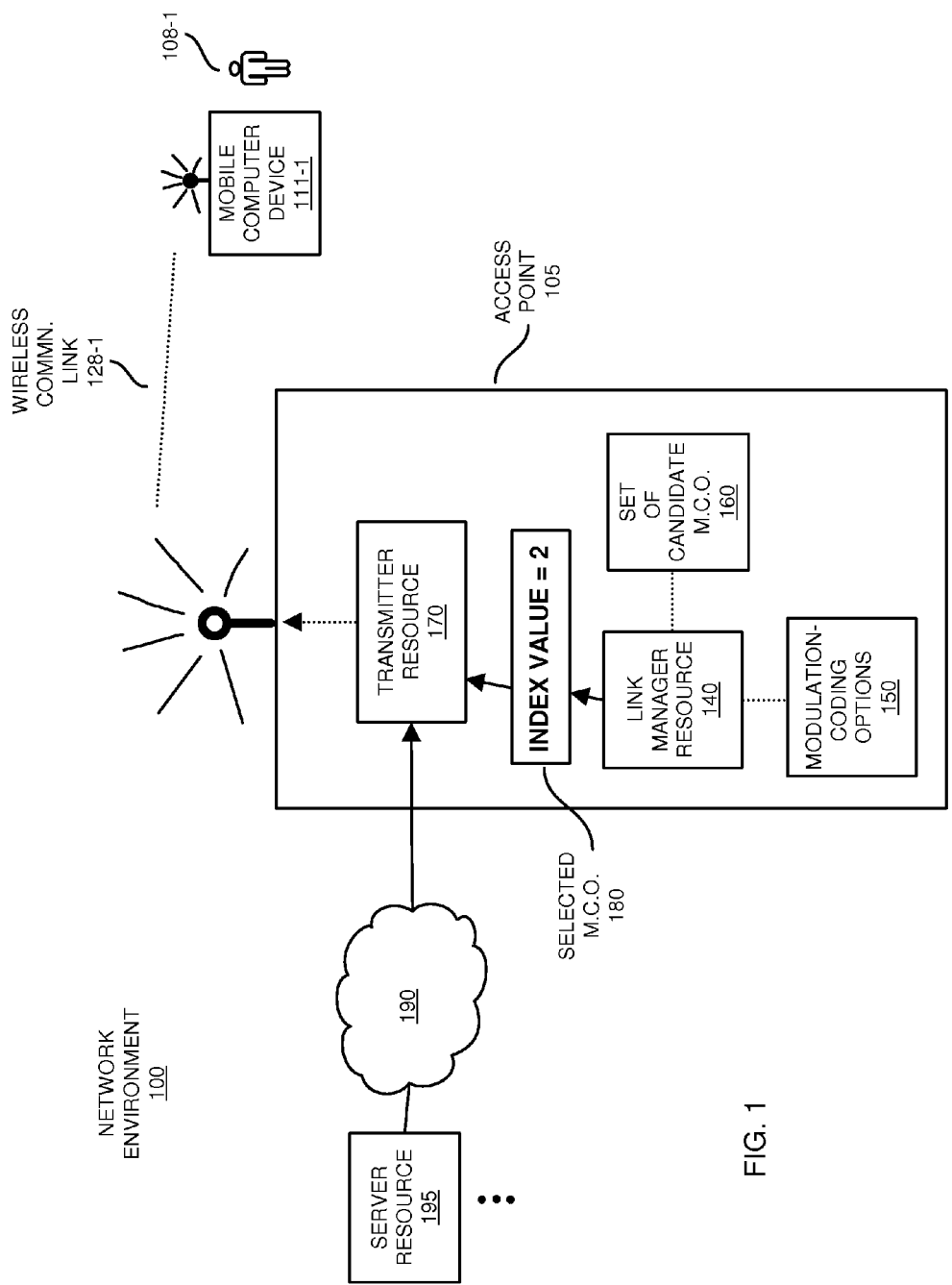
FIG. 1 is an example diagram illustrating a network environment including a wireless access point configured to provide enhanced quality of service according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

Now, more specifically, FIG. 1 is an example diagram illustrating a network environment including a wireless access point configured to provide enhanced quality of service to one or more communication devices according to embodiments herein.

As shown, network environment 100 includes server resource 195, network 190, wireless access point 105, and mobile computer device 111-1. Network 190 can be any suitable resource facilitating distribution of content to one or more client devices. In one non-limiting example embodiment, the network includes a cable network environment facilitating distribution of content to client devices in respective subscriber domains.

In this example embodiment, user 108-1 operates mobile computer device 111-1 to retrieve content from server resource 195. For example, user 108-1 executes an application on mobile computer device 111-1. The application establishes a respective communication link 128-1 over which the mobile computer device 111-1 communicates a request for content to wireless access point 105.

Wireless communication link 128-1 can be any suitable type of RF communication link. By way of a non-limiting example, the communication link 128-1 can be a WiFi™ network connection in accordance with any suitable 802.11 standard.

Wireless access point can be located in any suitable location. For example, wireless access point 105 can be located in a respective subscriber domain of a home. Alternatively, the wireless access point 105 can be a publicly accessible device.

Subsequent to receiving the request for content from mobile computer device 111-1, on behalf of mobile computer device 111-1, wireless access point 105 communicates the request for content over network 190 to retrieve content from server resource 195.

Server resource 195 transmits requested content over network 190 to wireless access point 105 for consumption (such as playback or storage).

Content retrieved over wireless communication link 128-1 can be any suitable type of data such as streaming video data. Content can be transmitted in accordance with any suitable protocol.

In one non-limiting example embodiment, the wireless access point 105 transmits the requested content using a lossy data packet transmission protocol such as UDP (User Datagram Protocol). In such an instance, lost or dropped data packets due to intermittent RF interference are not re-transmitted to the mobile computer device 111-1.

As an alternative to transmitting in accordance with a lossy protocol, the wireless access point 105 can be configured to transmit the requested content in accordance with a packet-switched network protocol in which lost data packets are re-transmitted to mobile computer device 111-1, thus guaranteeing delivery.

In this example embodiment, wireless access point 105 transmits corresponding content over wireless communication link 128-1 to mobile computer device 111-1. In one embodiment, the mobile computer device 111-1 executes a media player application that initiates playback of the received content on a display screen of the mobile computer device 111-1.

The wireless access point 105 can be configured to include multiple resources facilitating transmission of requested content to the mobile computer device 111-1. For example, wireless access point 105 includes link manager resource 140 and transmitter resource 170.

In one embodiment, link manager resource 140 selects one of multiple modulation-coding options 150 for transmission of the requested content over wireless communication link 128-1 to mobile computer device 111-1.

Assume in this example embodiment that the link manager resource 140 of wireless access point 105 receives notification of a bit rate setting needed to transmit corresponding requested content from wireless access point 105-1 to mobile computer device 111-1 (i.e., a communication device).

The bit rate setting information can be received from any suitable resource. In one embodiment, the link manager resource 140 receives the bit rate setting from the mobile computer device 111-1 as metadata associated with the corresponding requested content. As an alternative embodiment, the link manager resource 140 can be configured to receive the bit rate setting information from the server resource 195.

FIG. 2 is an example diagram illustrating different modulation-coding options according to embodiments herein. As shown, different types of wireless modulation types are available for transmission of respective content over wireless communication link 128-1 from wireless access point 105 to mobile computer device 111-1.

For example, the wireless access point 105 can be configured to transmit according to BPSK (Binary Phase-Shift Keying). BPSK is a relatively simple form of phase shift keying (PSK). BPSK uses two phases, which are separated by 180° to transmit data bits.

The wireless access point 105 can be configured to transmit according to QPSK (Quadrature Phase-Shift Keying). QPSK is sometimes known as quaternary PSK. QPSK uses four points on a constellation diagram to transmit data. Because there are four phases, QPSK can encode two bits per symbol.

The wireless access point 105 can be configured to transmit data using Quadrature amplitude modulation (QAM). QAM includes two carrier signals to transmit data. Modulation in accordance with QAM includes changing the amplitudes of two out-of-phase carrier waves to transmit data.

Embodiments herein can include transmitting at different code rates. A respective code rate indicates a capacity of transmitting non-redundant data over a respective wireless link. For example, if the code rate is k/n, for every k bits of useful information, the coder generates a total of n bits of data. The portion n-k bits are redundant bits facilitating transmission of data. The code rate may be expressed as 1/2, 2/3, 3/4, 5/6, 7/8, etc., which corresponds to a condition in which one redundant bit is inserted after every single, second, third, etc., bit in a data stream sequence.

In this example embodiment, each modulation-coding option in modulation-coding options 150 is assigned an index value. For example, a first modulation-coding option such as BPSK and coding rate 1/2 is assigned an index value of 0; a second modulation-coding option such as QPSK and coding rate 1/2 is assigned an index value of 1; a third modulation-coding option such as QPSK and coding rate 3/4 is assigned an index value of 2; a fourth modulation-coding option such as 16-QAM and coding rate 1/2 is assigned an index value of 3; and so on.

Each modulation-coding option supports a corresponding wireless transmission bit rate. For example, the first modulation-coding option (as indicated by index value=0) supports a data rate transmission of up to 6.5 megabits per second; the second modulation-coding option (as indicated by index value=1) supports a data rate transmission of up to 13 megabits per second; the third modulation-coding option (as indicated by index value=2) supports a data rate transmission of up to 19.5 megabits per second; the fourth modulation-coding option (as indicated by index value=3) supports a data rate transmission of up to 26 megabits per second; and so on.

Referring again to FIG. 1, in accordance with one embodiment, the link manager resource 140 of wireless access point 105 receives bit rate setting information. The bit rate setting information indicates a rate at which wireless communication link 128-1 must convey received content from server resource 195 in order to avoid playback interruptions of corresponding requested content at mobile computer device 111-1.

Assume in this example that the requested content conveyed from server resource 195 through wireless access point 105 over wireless communication link 128-1 requires a bit rate of up to 15 megabits per second. In such an instance, as shown in FIG. 3, the wireless access point 105-1 identifies a set of multiple possible (candidate) modulation-coding options 160 supporting transmission of the requested data at different bit rates greater than the bit rate setting (i.e., 15 megabits per second in this case) needed to transmit the corresponding content.

In this example embodiment, the link manager resource 140 identifies that modulation-coding options having a respective index value greater than 2 are able to provide the appropriate bandwidth over wireless communication link 128-1 to transmit the requested data.

In one embodiment, the link manager resource 140 of wireless access point 105 selects a respective modulation-coding option (in the set of candidate modulation-coding options 160) that provides a bit rate that is lower than the modulation-coding option in the set providing the highest possible bit rate. For example, the link manager resource 140 selects modulation-coding option having an index value of 2 for transmitting the requested content over wireless communication link 128-1 to the mobile computer device 111-1. The modulation-coding option assigned an index value of 8 supports a much higher data rate. However, selection of the lower bit rate modulation-coding option (assigned index value of 2) provides adequate capacity to transmit the corresponding content, yet does so with a higher signal to noise ratio than would be provided by the higher bit rate modulation-coding option (assigned index value 8). Thus, although data can be transmitted at the highest bit rate modulation-coding option (assigned index value 8), transmission of data at such a high bit rate modulation-coding option is susceptible to loss of data (due to low signal to noise margins).

Subsequent to selection and notifying the transmitter resource 170 of the selected modulation-coding option 180, the transmitter resource 170 of the wireless access point 105 initiates transmission of the corresponding requested content received from server resource 195 to the target communication device (mobile computer device 111-1) in accordance with the selected modulation-coding option 180.

Note that the selection of a respective modulation-coding option for transmitting data downstream over wireless communication link 128-1 can be achieved in any number of different ways. For example, in one embodiment, the wireless access point 105 can be configured to receive notification to transmit corresponding content over a wireless communication link to a target communication device in the wireless network environment. The link manager resource 140 of wireless access point 105 can be configured to produce an index value representing the selected modulation-coding option 180.

One embodiment herein includes receiving bit rate information indicating a bandwidth required to transmit the corresponding requested content over communication link 128-1 to the mobile computer device 111-1 and producing the index value based at least in part on the received bit rate information.

The transmitter resource 170 of the wireless access point 105 can be configured to use the index value or pointer value (identifying the selected modulation-coding option) to determine a corresponding modulation-coding option in a group of multiple candidate modulation-coding options 160 that have the appropriate capacity to transmit the corresponding content at a sufficiently high bit rate.

As previously discussed, conventional techniques of transmitting content include selecting a modulation-coding option that provides a highest possible bit rate. In such an instance, many of the corresponding data packets associated with the data stream would be lost due to noise. In contrast to conventional techniques, embodiments herein include selecting a lower bit rate modulation-coding option in the index of modulation-coding options. The lower bit rate modulation-coding option provides a higher error margin. More specifically, in one embodiment, the link manager resource 140 selects the modulation-coding option 180 amongst the multiple candidate modulation-coding options in the set 160 based at least in part due to the better signal to noise ratio provided by the candidate modulation-coding options in the set. Accordingly, one embodiment herein includes selecting the modulation-coding option amongst the multiple candidate modulation-coding options in the set 160 based at least in part on an error rate of transmitting data using the candidate modulation-coding options.

In one non-limiting example embodiment, the selected modulation-coding option 180 (such as the modulation-coding option assigned an index value of 2) provides a greater signal to noise ratio than other candidate modulation-coding options in the set 160. Transmitting the requested content at the modulation-coding option assigned an index value of 2 provides a better signal to noise ratio than would be afforded by transmitting the requested content at the modulation-coding option assigned index values greater than 2 (such as the modulation-coding option assigned an index value=3; modulation-coding option assigned an index value=4; modulation-coding option assigned an index value=5; and so on). In one embodiment, the selected modulation-coding option 180 can provide a lowest bit error rate (or highest signal to noise ratio) of transmitting the corresponding content amongst the multiple candidate modulation-coding options in the set 160. As mentioned, each candidate modulation-coding option in the set 160 provides sufficient capacity to transmit the corresponding requested content.

In one non-limiting example embodiment, the selected modulation-coding option 180 as specified by the index value #2 provides: i) a maximum signal to noise ratio, and ii) sufficient capacity to transmit the corresponding requested content at the required bandwidth as specified by bit rate information associated with the requested content.

Subsequent to selection by link manager resource 140, the wireless access point 105 transmits the corresponding content over the wireless communication link 128-1 to the target communication device (in this case, mobile computer device 111-1) in accordance with the selected modulation-coding option 180.

Note that selection of the modulation-coding option assigned the index value=2 is shown by way of non-limiting example only. In accordance with yet further embodiments, note that the link manager resource 140 can be configured to select any suitable modulation-coding option in the set of modulation-coding options 160 (such as modulation-coding option assigned index value=3, modulation-coding option assigned index value=4; etc.) to transmit the requested content. Each successively higher indexed modulation-coding option provides higher error or lower signal to noise ratio margin.

In one embodiment, the link manager resource 140 can be configured to select a modulation-coding option in the list that supports transmitting a lower number of bits per symbol than other candidate modulation-coding options in the set. For example, the modulation-coding options assigned respective index values 2, 3, 4, 5, etc., support transmitting a lower number of bits per symbol than does modulation-coding options assigned index values 7, 8, . . . . Transmitting data using fewer bits per symbol increases a likelihood that the respective data will be properly received at a target destination such as mobile computer device 111-1.

In one embodiment, instead of selecting a lowest magnitude index value that provides a sufficient bit rate to transmit data, embodiments herein can include selecting a grouping of modulation-coding schemes (such as modulation-coding options assigned respective index values 2, 3, 4) as the modulation-coding options in which to transmit corresponding data packets to a target communication device. The wireless access point can dynamically select amongst the modulation-coding options assigned index values 2, 3, and 4 to transmit corresponding content to a target communication device.

As previously discussed, conventional techniques include dynamically selecting different modulation-coding options depending on an amount of detected signal attenuation. In contrast to conventional techniques, one embodiment herein includes transmitting an entirety of corresponding requested content from the wireless access point 105 over the communication link 128-1 to the mobile computer device 111-1 (i.e., target communication device) via a fixed modulation-coding option as specified by the selected modulation-coding option 180. In such an instance, because the modulation-coding option is fixed, there is no loss of data packets associated with the requested content. The extra signal to noise ratio margin afforded by the lower numbered indexed modulation-coding option enables a user 108-1 to move about with the mobile computer device 111-1, without losing data packets. In other words, the amount of signal attenuation between the wireless access point 105 and the mobile computer device 111-1 may increase due to movement of the mobile computer device 111-1 away from the wireless access point 105. However, there may be no loss of data packets in this situation because there is sufficient extra signal to noise margin to accommodate higher attenuation.

Thus, the forced reduction in selected MCS to a lower bit rate has the effect of extending the range of the wireless communication link as well as increasing reliability of transmitting data over the link as previously described. In other words, the basic premise of one embodiment is that high data rates only work well at short distances, but coverage (in a home or physical environment) is extended greatly by lowering the selected modulation-coding scheme. Via the lower selected modulation-coding scheme, the corresponding wireless communication link is able to distribute video on a "just-enough" data rate basis.

Figure 4:
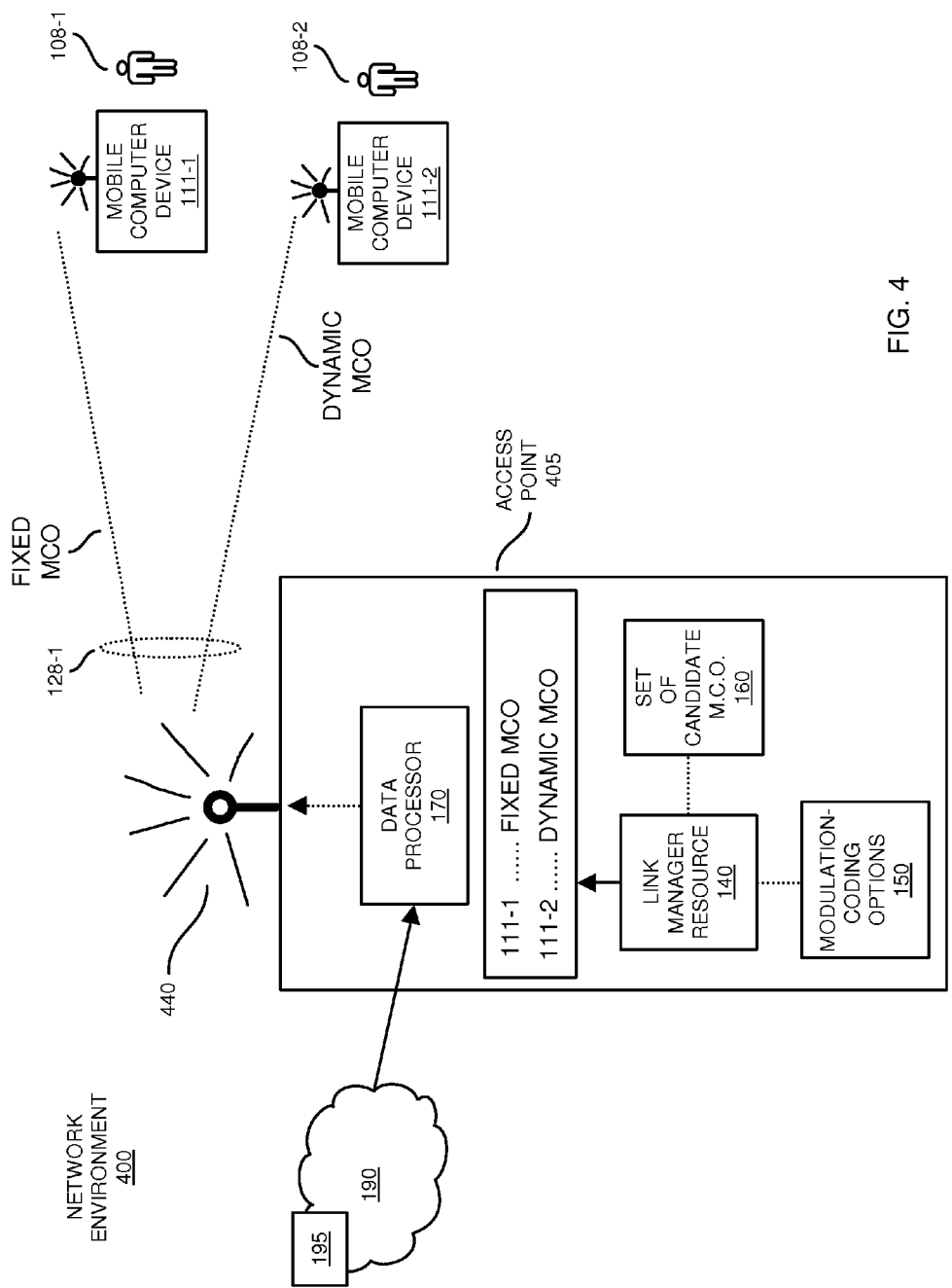
FIG. 4 is an example diagram illustrating mixed mode transmission of data from an access point to multiple mobile computer devices according to embodiments herein.

FIG. 4 is an example diagram illustrating mixed mode transmission of data from an access point to multiple mobile computer devices according to embodiments herein. In the mixed mode, the wireless access point 405

As shown, wireless access point 405 can be configured to include a single transmitter antenna resource 440. In one embodiment, the wireless access point 405 receives a request from the mobile computer device 111-1 for retrieval of first content; the wireless access point 405 receives a request from mobile computer device 111-2 for retrieval of second content. User 108-2 operates mobile computer device 111-2.

In such an instance, the wireless access point 405 allocates a first portion of available wireless bandwidth in the wireless communication link 128-1 to transmit the corresponding first content from wireless access point 405 to the mobile computer device 111-1 at a fixed modulation-coding option (such as selected modulation-coding option 180); the wireless access point 405 allocates a second portion of bandwidth in the wireless communication link 128-1 to transmit second content from wireless access point 405 to mobile computer device 111-2 at dynamically selected modulation-coding options that vary depending on an amount of detected signal attenuation between the wireless access point 405 and the mobile computer device 111-2.

In one embodiment, the content transmitted from wireless access point 405 the mobile computer device 111-1 is video data. The content transmitted from wireless access point 405 to the mobile computer device 111-2 is browser data. The wireless access point 405 can be configured to select a fixed modulation-coding option (or modulation-coding options 180) for transmission of data to mobile computer device 111-1 based at least in part on detecting that the corresponding content is video data. As previously discussed, selection of the lower number indexed modulation-coding option supporting a sufficient bit rate reduces an amount of lost data packets.

In one embodiment, the wireless access point 405 can be configured to operate in a mixed (time division multiple access) mode in which: i) the access point 405 transmits first corresponding content to the mobile computer device 111-1 at the selected modulation-coding option 180 in a manner as previously discussed, and ii) the access point dynamically transmits data (at different modulation-coding options providing highest bit rates) to mobile computer device 111-2 in the network environment 400.

Figure 5:
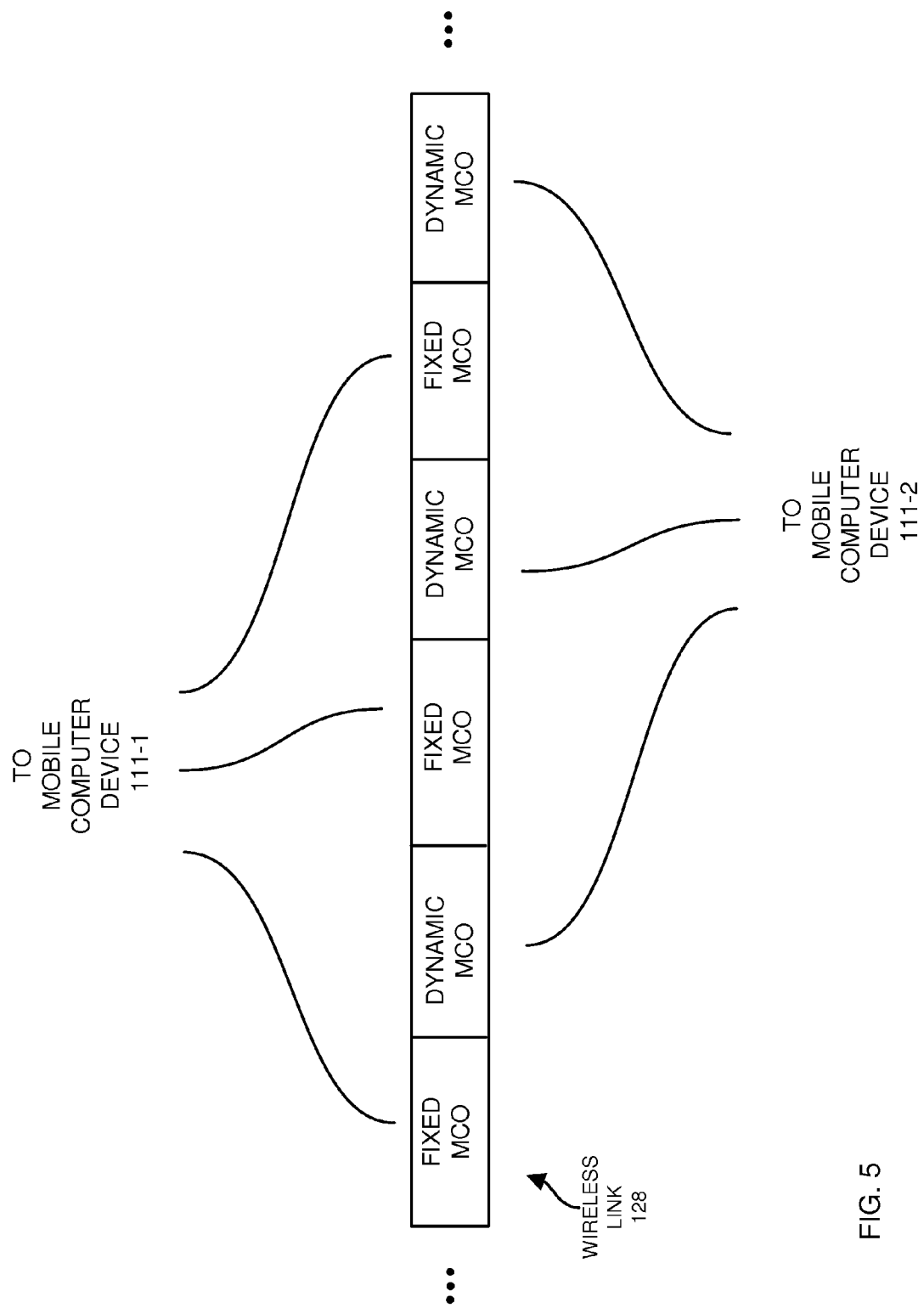
FIG. 5 is an example diagram illustrating time-slotted transmission of data to multiple communications devices according to embodiments herein.

FIG. 5 is an example diagram illustrating time-slotted transmission of data according to embodiments herein.

As shown, the access point 405 switches between operating in a first selected mode and a second selected mode.

For example, in the first selected mode, in a first set of corresponding time slots or segments of a time division multiple access wireless channel (such as wireless communication link 128-1), the wireless access point 405 transmits corresponding requested content to the mobile computer device 111-1 at the selected modulation-coding option 180 (such as a fixed modulation-coding option). Thus, a first portion of available bandwidth in wireless communication link 128-1 can be used to transmit content from wireless access point 405 to mobile computer device 111-1.

In the second selected mode, in a second set of time slots or segments of the time division multiple access channel, the wireless access point 405 transmits corresponding requested content to the mobile computer device 111-2 at varying modulation-coding options depending on current link conditions. In one non-limiting example embodiment, in the second selected mode, the wireless access point 405 transmits data to the mobile computer device 111-2 via dynamic selection of highest available possible bit rate modulation-coding options suited for the current link conditions. Thus, a second portion of available bandwidth in wireless communication link 128-1 can be used to transmit content from wireless access point 405 to mobile computer device 111-1.

Accordingly, in a mixed transmission mode, the wireless access point 405 can be configured to switch between transmitting in the different modes to accommodate transmission of data to different types of users. As shown, the first set of time segments (such as the fixed modulation-coding option) are interleaved amongst the second set of time segments (such as the ever-changing dynamic modulation-coding options).

Figure 6:
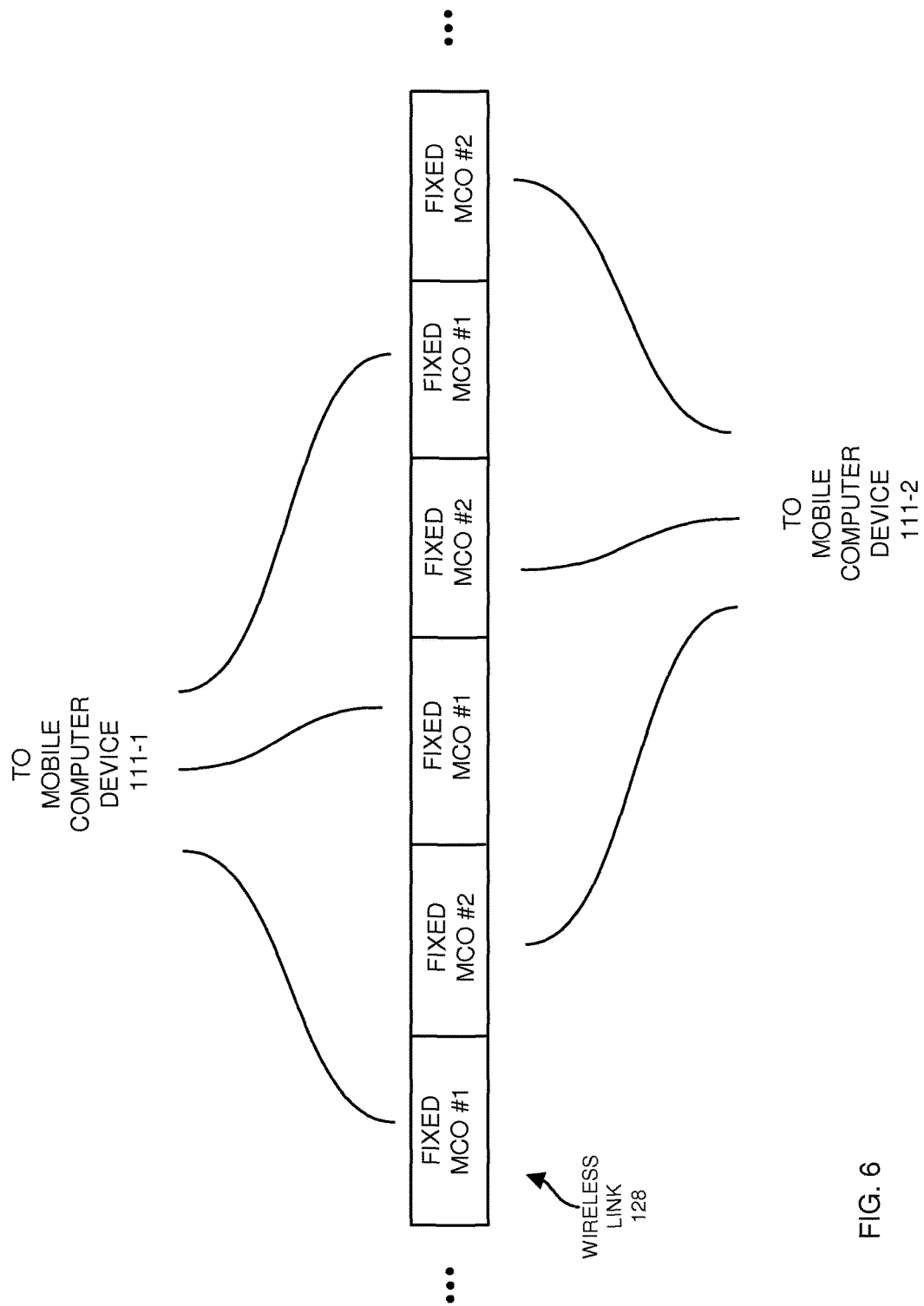
FIG. 6 is an example diagram illustrating time-slotted transmission of data to multiple communication devices according to embodiments herein.

FIG. 6 is an example diagram illustrating time-slotted transmission of data according to embodiments herein.

In one embodiment, the wireless access point 405 can be configured to transmit content at a substantially fixed modulation-coding option when the retrieved content is streaming video data. The wireless access point 405 can be configured to transmit browser-retrieved content at varying bit rate modulation-coding options.

Assume in this example that the mobile computer device 111-2 switches to retrieving video data (such as a relatively constant data stream requiring 28 megabits per second) as opposed to web browser data (short bursts of data) and that the mobile computer device 111-1 continues to retrieve video data. In such an instance, the wireless access point 405 can be configured to select an appropriate modulation-coding option (such as fixed modulation-coding option as specified by index value=4) in a manner as previously discussed to transmit the requested video content to the mobile computer device 111-2. Modulation-coding options such as 4, 5, 6, 7, 8, . . . all provide sufficient bit rates to transmit the data. However, selection of modulation-coding option #4 provides a greater amount of signal to noise ratio than other indexed values.

To accommodate users 108-1 and 108-2, the wireless access point 405 transmits requested content in a first set of segments (at fixed modulation-coding option #1 such as modulation-coding option #2) to mobile computer device 111-1; the wireless access point 405 transmits requested content in a second set of segments (at fixed modulation-coding option #2 such as modulation-coding option 4) to mobile computer device 111-2.

Figure 7:
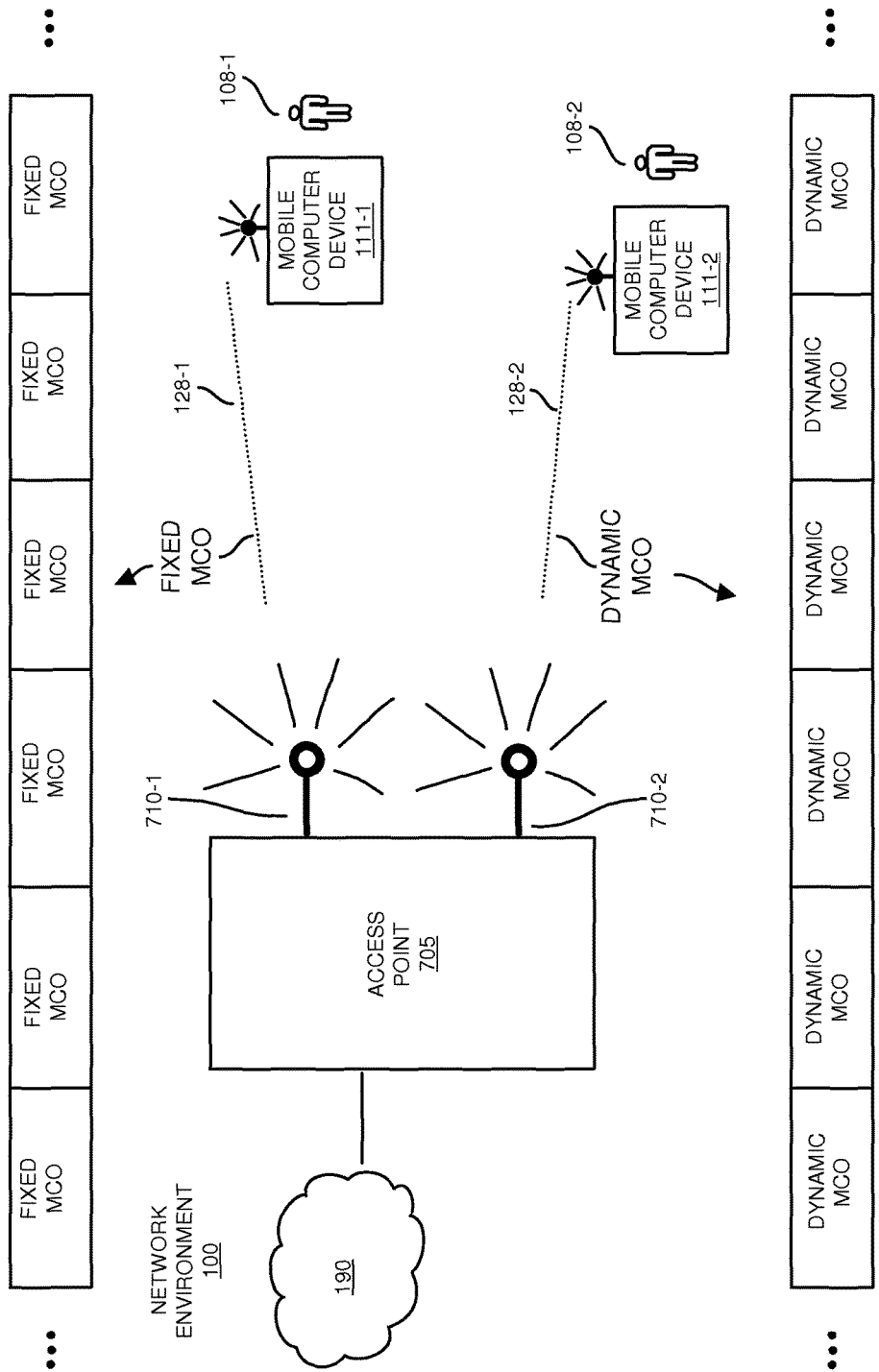
FIG. 7 is an example diagram illustrating a multi-transmitter access point according to embodiments herein.

FIG. 7 is an example diagram illustrating a multi-transmitter access point according to embodiments herein.

As an alternative to using time division multiple access techniques to transmit content to multiple different communication devices, embodiments herein can include transmitting content over spatially distinct wireless communication links.

For example, as previously discussed, the mobile computer devices 111 can request retrieval of different types of content. In one embodiment, to accommodate the requests for content, the wireless access point 705 transmits the content to mobile computer device 111-1 at the selected modulation-coding option 180 (such as a substantially fixed modulation-coding option #2) from a first transmitter device 710-1 in the access point 705 to the mobile computer device 111-1; the wireless access point 705 transmits the content to mobile computer device 111-2 at a dynamically selected modulation-coding option from a second transmitter device 710-2 in the access point 705 to the mobile computer device 111-2.

In a similar manner as previously discussed, the user 108-2 may request retrieval of streaming video data using an appropriate media player application executing on mobile computer device 111-2. In such an instance, the wireless access point 705 can be configured to switch to a mode of selecting an appropriate fixed modulation-coding option for transmitting the respective requested content to the mobile computer device 111-2.

In one embodiment, the content is available for retrieval from a corresponding cable network service provider. The wireless access point 705 can be configured to transmit the requested content an appropriate selected modulation-coding option (such as selected modulation-coding option 180) to provide uninterrupted, high quality streaming video to a requesting subscriber. As previously discussed, this increases a reliability of data transfer and maximizes a wireless link budget in favor of lower probability transmission errors.

In one embodiment, transmitting content at a substantially fixed modulation-coding option for at least a duration of time (as opposed to varying the modulation-coding option in that time) reduces the amount of buffering hardware needed in the target communication device because it can be assured that the greater signal to noise ratio margin will increase the overall quality of services of transmitting data to the respective target communication devices. In other words, consistent delivery of content is almost assured at the lower modulation-coding option bit rates.

Figure 8:
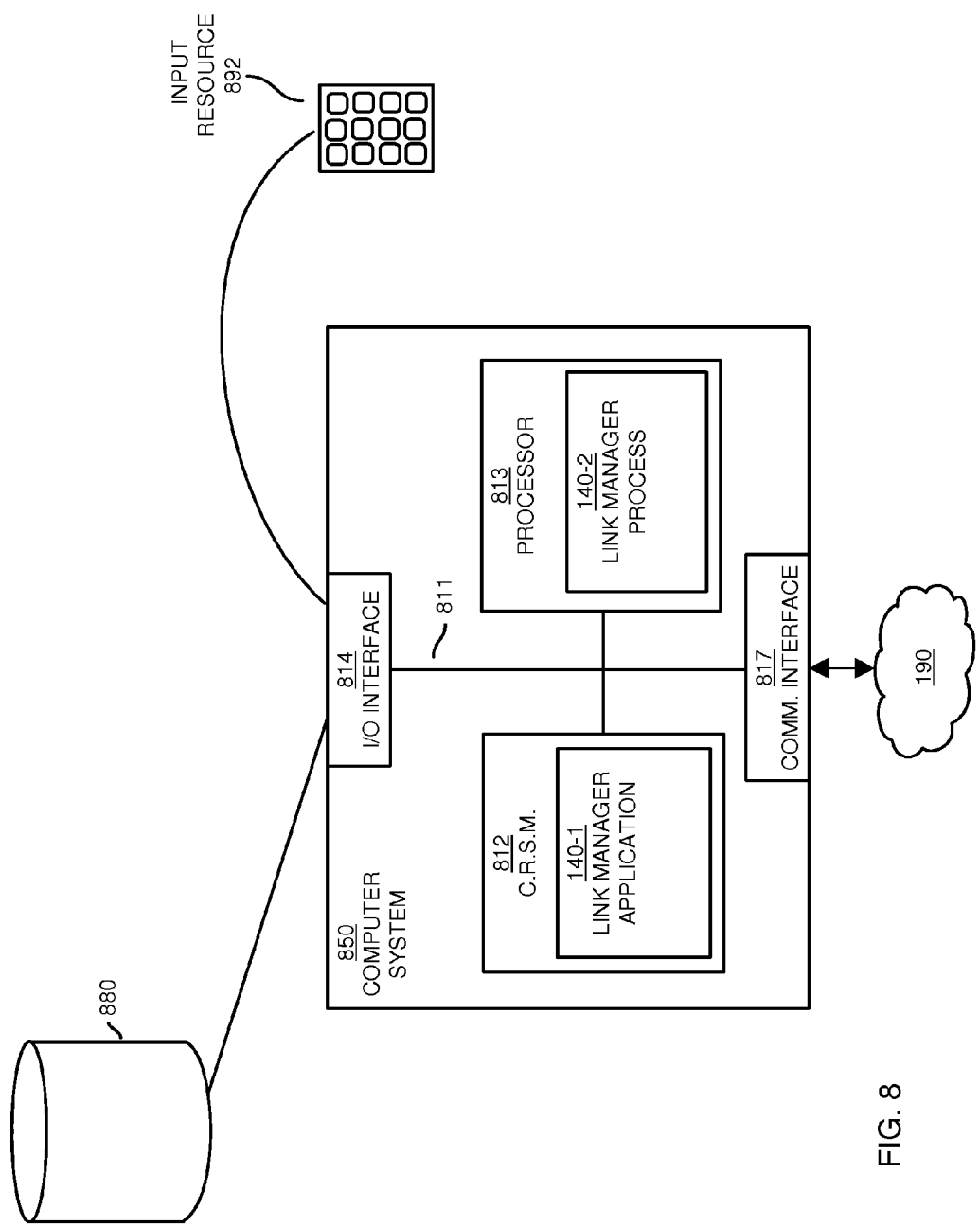
FIG. 8 is a diagram illustrating an example computer architecture in which to execute any of the functionality according to embodiments herein.

FIG. 8 is an example block diagram of a computer device for implementing any of the operations as discussed herein according to embodiments herein.

In one embodiment, the computer system 850 resides in or is in communication with wireless access point 105 to carry out one or more operations as discussed herein.

As shown, computer system 850 of the present example includes an interconnect 811, a processor 813 (such as one or more processor devices, computer processor hardware, etc.), computer readable storage medium 812 (such as hardware storage to store data), I/O interface 814, and communications interface 817.

Interconnect 811 provides connectivity amongst processor 813, computer readable storage media 812, I/O interface 814, and communication interface 817.

I/O interface 814 provides connectivity to a repository 880 and, if present, other devices such as a playback device, display screen, keypad 892, a computer mouse, etc.

Computer readable storage medium 812 (such as a non-transitory hardware medium) can be any hardware storage resource or device such as memory, optical storage, hard drive, rotating disk, etc. In one embodiment, the computer readable storage medium 812 stores instructions and/or data executed by processor 813.

Communications interface 817 enables the computer system 850 and processor 813 to communicate over a resource such as network 190 to retrieve information from remote sources and communicate with other computers. I/O interface 814 enables processor 813 to retrieve stored information from repository 880.

As shown, computer readable storage media 812 is encoded with link manager application 140-1 (e.g., software, firmware, etc.) executed by processor 813. Link manager application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in link manager application 140-1 stored on computer readable storage medium 812.

Execution of the link manager application 140-1 produces processing functionality such as link manager process 140-2 in processor 813. In other words, the link manager process 140-2 associated with processor 813 represents one or more aspects of executing link manager application 140-1 within or upon the processor 813 in the computer system 850.

Those skilled in the art will understand that the computer system 850 can include other processes and/or software and hardware components, such as an operating system that controls allocation and use of hardware resources to execute link manager application 140-1.

In accordance with different embodiments, note that computer system may be any of various types of devices, including, but not limited to, a wireless access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 850 may reside at any location or can be included in any suitable resource in network environment 100 to implement functionality as discussed herein.

Functionality supported by the different resources will now be discussed via flowcharts in FIGS. 9 and 10. Note that the steps in the flowcharts below can be executed in any suitable order.

Figure 9:
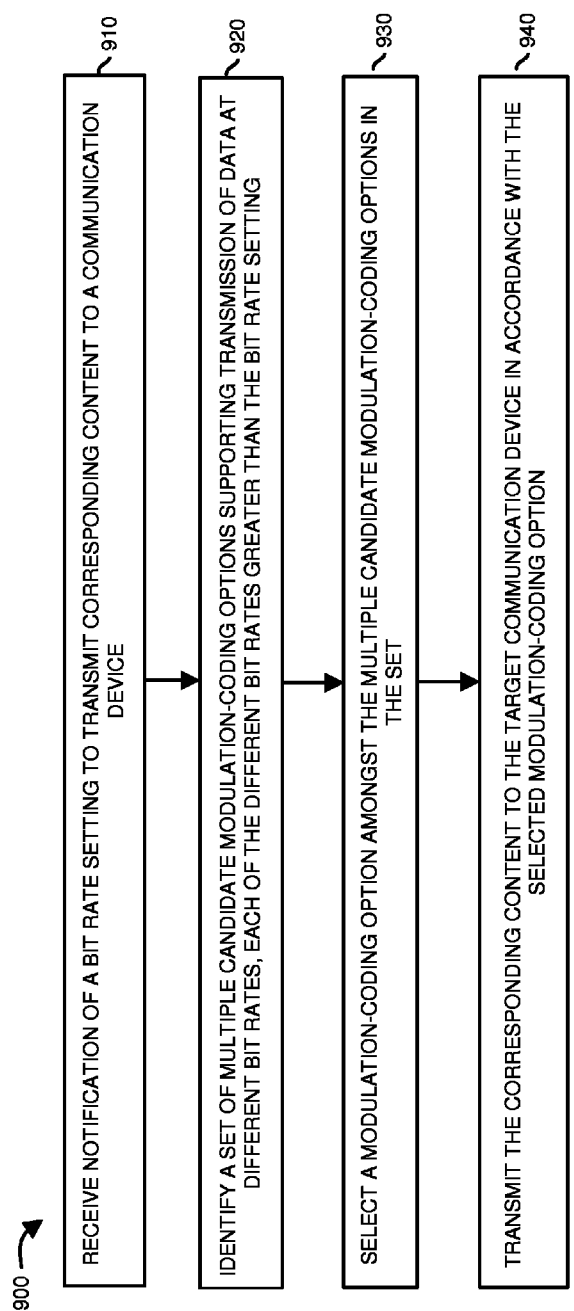
FIGS. 9 and 10 are example diagrams illustrating methods according to embodiments herein.

FIG. 9 is a flowchart 900 illustrating an example method according to embodiments. Note that there will be some overlap with respect to concepts as discussed above.

In processing block 910, the wireless access point 105 receives notification of a bit rate setting at which to transmit corresponding requested content to a communication device such as mobile computer device 111-1.

In processing block 920, from modulation-coding options 150, the wireless access point 105 identifies a set of multiple candidate modulation-coding options 160 supporting transmission of data at different possible bit rates. Each of the different bit rates is greater than the bit rate setting needed to transmit the requested content.

In processing block 930, the wireless access point 105 selects a particular modulation-coding option amongst the multiple modulation-coding options in the set 160.

In processing block 940, the wireless access point 105 transmits the corresponding requested content to the target communication device (e.g., mobile computer device 111-1) in accordance with the selected modulation-coding option 180.

Figure 10:
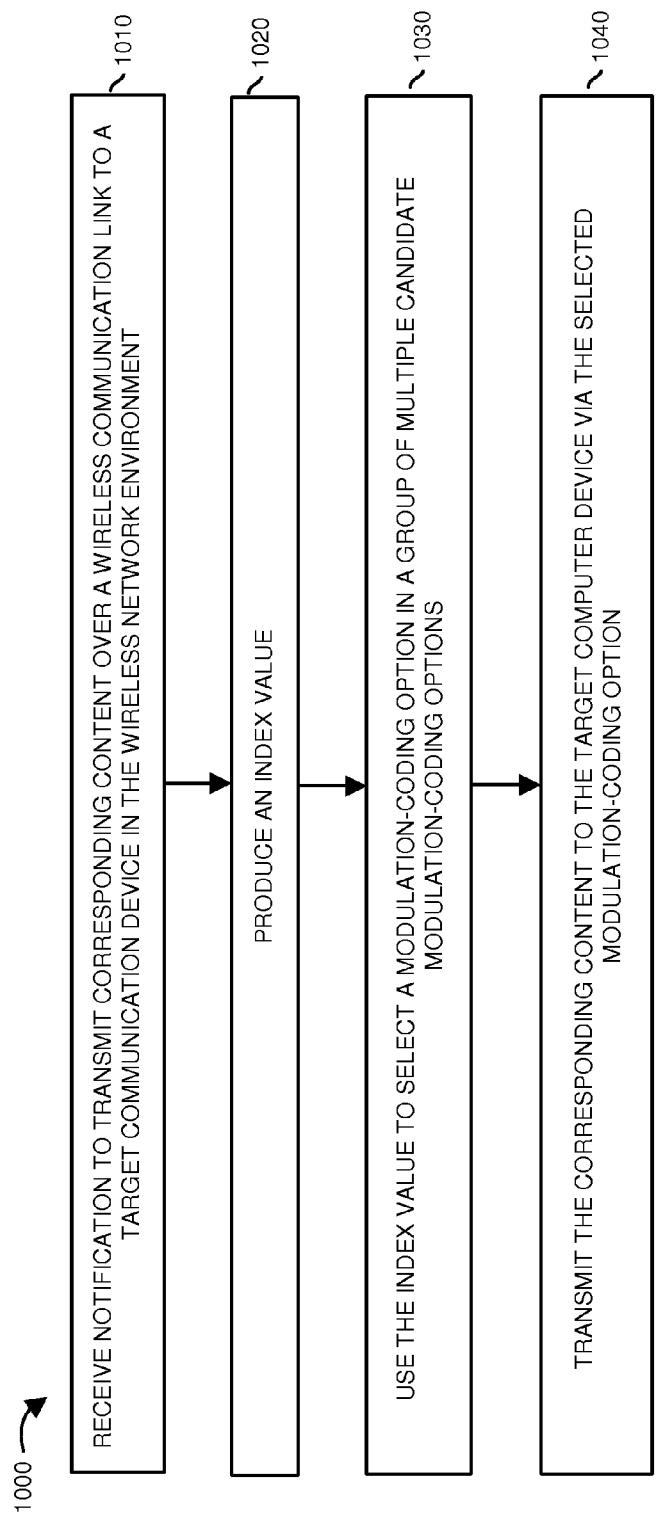

FIG. 10 is a flowchart 1000 illustrating an example method according to embodiments. Note that there will be some overlap with respect to concepts as discussed above.

In processing block 1010, the wireless access point 105 receives notification to transmit corresponding content over a wireless communication link 128-1 to a target computer device (such as mobile computer device 111-1) in the wireless network environment 100.

In processing block 1020, the wireless access point 105 produces an index value.

In processing block 1030, the wireless access point 105 uses the index value to select a modulation-coding option in a group of multiple candidate modulation-coding options 150.

In processing block 1040, the wireless access point 105 transmits the corresponding content to the computer device via the selected modulation-coding option 180.

Additional Non-limiting Example Embodiments

Embodiments herein include a simple technique for maximizing quality of service over any WiFi link, by using a lower data rate over single or multiple streams. The technique can include a modification to the 802.11b/g/n/ac standards such that the modulation-coding scheme is controlled to suit an application such as transmission of video over WiFi.

Instead of maximizing the data rate, by choosing the highest level of MCS (QAM256 in the case of 802.11ac) embodiments herein include choosing the lowest MCS necessary to establish a fixed data rate between an access point, gateway, and a client device. For any particular video stream (MPEG-2, H.264 or HEVC) the required amount of data rate is fairly constant and much lower than the maximum rates offered by the WiFi standards, so it is possible to compromise the WiFi data throughput rate below the maximum possible for any link, and at the same time improve on the reliability of the stream. The QoS is thereby much increased by virtue of having higher noise margins. For example, a single data link over two 802.11n devices will maximize at 72 Mbps using an MCS of QAM256 with only 33 dB of signal-to-noise ratio (SNR). If only a single H.264 (MPEG-4) HD video stream is required from an AP to a Client then typically this would require less than 15 Mbps. Embodiments herein include a unique method in which a single stream would run at the next available MCS above that required for 15 Mbps. In this case, the system would make use of the MCS Index 2 (QPSK with a coding rate of 3/4). The advantage is that QPSK requires an SNR of only 12 dB. Since, an unmodified 802.11ac system would have chosen the maximum MCS Index of 8 (QAM-256 at ¾coding) at 78 Mbps, this would have provided much higher date than needed, and as a result the noise tolerance. QAM-256 requires 33 dB of SNR for substantially zero packet loss, and so 11 dB of margin improvement has been obtained by lowering the MCS.

A second benefit is that this system fixes the MCS instead of allowing a dynamically altering MCS, and as a result does not suffer from packet data loss Embodiments herein can increase the overall quality of service for video streams (not tolerant of packet errors because the cause macro-blocking and intermittent loss of audio) without significant change in the technology used to support WiFi. The technique can be used in multi-stream environments, and with 20, 40 and 80 MHz RF channels as already covered by the 802.11n and ac standards, with little modification, but with greatly enhanced operation with respect to gaining a much higher level of error margin.

Note again that techniques herein are well suited for managing transmissions of requested content to one or more communication devices over a wireless communication links. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   at a wireless access point in a wireless network environment:
   receiving notification of a bit rate setting to transmit corresponding content to a communication device via a wireless communication link between the wireless access point and the communication device;
   identifying a set of multiple candidate modulation-coding options supporting transmission of data at different bit rates greater than the bit rate setting as specified by the notification, the set including a first candidate modulation-coding option and a second candidate modulation-coding option, the first candidate modulation-coding option supporting transmission of data at a first bit rate greater than the bit rate setting, the second candidate modulation-coding option supporting a second bit rate which is lower than the first bit rate supported by the first candidate modulation-coding option;
   selecting the second candidate modulation-coding option instead of the first candidate modulation-coding option to transmit the corresponding content, use of the selected second candidate modulation-coding option providing a greater range of communicating than a communication range otherwise supported via use of the first candidate modulation-coding option to communicate over the wireless communication link from the wireless access point to the communication device;
   transmitting the corresponding content to the communication device via the wireless communication link using the second candidate modulation-coding option; and
   the method further comprising: at the wireless access point, switching between operating in a first selected mode and a second selected mode, the first selected mode facilitating transmission of content at the second candidate modulation-coding option, the second selected mode facilitating transmission of data to the communication device via dynamic selection of highest possible bit rate modulation-coding options.

2. The method as in claim 1 further comprising:
   selecting the second modulation-coding option amongst the multiple candidate modulation-coding options in the set based at least in part on an error rate of transmitting data when using the second candidate modulation-coding option for transmitting the corresponding content to the communication device via the wireless communication link.

3. The method as in claim 1, wherein the second candidate modulation-coding option is a fixed modulation-coding option, the method further comprising:
   transmitting an entirety of the corresponding content from the wireless access point to the communication device via the second candidate modulation-coding option.

4. The method as in claim 1, wherein the second candidate modulation-coding option provides a lowest bit error rate of transmitting the corresponding content amongst the multiple candidate modulation-coding options in the set, each of the multiple candidate modulation-coding options in the set providing sufficient capacity to transmit the corresponding content.

5. The method as in claim 1, wherein the communication device is a first communication device, the method further comprising:
   allocating a first portion of bandwidth in the wireless communication link to transmit the corresponding content via the second candidate modulation-coding option; and
   allocating a second portion of bandwidth in the wireless communication link to transmit second content to a second communication device in the wireless network environment.

6. The method as in claim 1 further comprising:
transmitting the corresponding content using a lossy data packet transmission protocol.

7. The method as in claim 1, wherein the second candidate modulation-coding option supports transmitting a lower number of bits per symbol than other candidate modulation-coding options in the set.

8. The method as in claim 1 further comprising:
selecting the second modulation-coding option based at least in part on detecting that the corresponding content is video data.

9. The method as in claim 1, wherein the communication device is a first communication device, the method further comprising:
operating the wireless access point in a mixed mode in which: i) the wireless access point transmits the corresponding content to the first communication device using the second candidate modulation-coding option, and ii) the wireless access point dynamically transmits data to a second communication device in the wireless network environment at different selected modulation-coding options.

10. The method as in claim 1 further comprising:
receiving the bit rate setting from the communication device, the bit rate setting being metadata associated with the corresponding content.

11. An apparatus comprising:
computer processor hardware; and
a management resource executed on the computer processor hardware, the management resource operable to:
receive notification of a bit rate setting to transmit corresponding content to a communication device via a wireless communication link between a wireless access point and the communication device;
identify a set of multiple candidate modulation-coding options supporting transmission of data at different bit rates greater than the bit rate setting, the set including a first candidate modulation-coding option and a second candidate modulation-coding option, the first candidate modulation-coding option supporting transmission of data at a first bit rate which is greater than the bit rate setting as indicated by the notification, the second candidate modulation-coding option in the set of multiple candidate modulation-coding options supporting a second bit rate which is lower than the first bit rate supported by the first candidate modulation coding option;
select the second candidate modulation-coding option instead of the first candidate modulation-coding option, the second candidate modulation-coding option selected to extend a range of the wireless communication link and increase a reliability of transmitting the corresponding content over the wireless communication link in comparison to otherwise using the first candidate modulation-coding option to communicate over the wireless communication link;
transmit the corresponding content from the wireless access point to the communication device via the wireless communication link using the second candidate modulation-coding option; and
switching between operating the wireless access point in a first selected mode and a second selected mode, the first selected mode facilitating transmission of content at the second candidate modulation-coding option, the second selected mode facilitating transmission of data to the communication device via dynamic selection of highest possible bit rate modulation-coding options.

12. The apparatus as in claim 11, wherein the selection of the second candidate modulation-coding option is further based on an error rate of transmitting data when using the second candidate modulation-coding option for transmitting the corresponding content to the communication device via the wireless communication link.

13. The apparatus as in claim 11, wherein the second candidate modulation-coding option provides a lowest bit error rate of transmitting the corresponding content amongst the multiple candidate modulation-coding options, each of the multiple candidate modulation-coding options providing sufficient capacity to transmit the corresponding content.

14. The apparatus as in claim 11, wherein the computer processor hardware further performs operations of:
transmitting the corresponding content using a lossy data packet transmission protocol.

15. The apparatus as in claim 11, wherein the second candidate modulation-coding option supports transmitting a lower number of bits per symbol than other candidate modulation-coding options in the set.

16. The apparatus as in claim 11, wherein the selection of the second candidate modulation-coding option is further based on detecting that the corresponding content is video data.

17. Computer-readable hardware storage having instructions stored thereon, the instructions, when carried out by computer processor hardware, cause the computer processor hardware to:
receive notification to transmit corresponding content over a wireless communication link to a communication device in a wireless network environment;
identify a rate at which to transmit the corresponding content;
select a modulation-coding option in a group of multiple candidate modulation-coding options that support a bit rate higher than the identified rate, the selected modulation-coding option providing the lowest bit rate transmission amongst the multiple candidate modulation-coding options in the group;
transmit the corresponding content over a wireless access point to the communication device via the selected modulation-coding option; and
switch between operating the wireless access point in a first selected mode and a second selected mode, the first selected mode facilitating transmission of content at the selected modulation-coding option, the second selected mode facilitating transmission of data to the communication device via dynamic selection of highest possible bit rate modulation-coding options.

18. The method as in claim 1, wherein the second candidate modulation-coding option supports transmitting a lower number of bits per symbol than the first candidate modulation-coding option.

19. The method as in claim 18, wherein use of the second candidate modulation-coding option to communicate over the wireless communication link provides increased reliability with respect to otherwise using the first candidate modulation-coding option to communicate over the wireless communication link.

20. The method as in claim 1, wherein each of the multiple candidate modulation-coding options in the set supports a different bit rate of transmitting data over the wireless communication link.

* * * * *